United States Patent
Gagliardi et al.

(12) 
(10) Patent No.: US 6,334,119 B1
(45) Date of Patent: Dec. 25, 2001

(54) METHOD AND SYSTEM FOR SELECTIVELY INTERACTING WITH A POSTAGE METER PROVIDED ON AN INSERTER SYSTEM

(75) Inventors: Michael A. Gagliardi, Planstville; James Kerans, Rowayton; Laurie J. Salvati, Bridgeport, all of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/191,354

(22) Filed: Nov. 13, 1998

(51) Int. Cl.[7] ................................................ G06F 17/60
(52) U.S. Cl. ........................ 705/60; 705/400; 705/401; 705/405; 705/410
(58) Field of Search .................................... 705/400, 401, 705/405, 406, 410, 60

(56) References Cited

U.S. PATENT DOCUMENTS

| | | | |
|---|---|---|---|
| 3,792,446 | 2/1974 | McFiggans et al. | 340/172.5 |
| 3,935,429 | 1/1976 | Branecky et al. | 235/61.11 E |
| 4,138,735 | 2/1979 | Allocca et al. | 364/900 |
| 4,447,890 | 5/1984 | Duwel et al. | 364/900 |
| 4,527,791 | 7/1985 | Piotroski | 270/58 |
| 4,535,421 | 8/1985 | Duwel et al. | 364/900 |
| 4,568,072 | 2/1986 | Piotroski | 270/58 |
| 4,817,042 | 3/1989 | Pintsov | 364/478 |
| 4,908,770 | * 3/1990 | Bresault et al. | 364/464.02 |
| 5,027,279 | 6/1991 | Gottlieb et al. | 364/478 |
| 5,245,547 | 9/1993 | Ramsey | 364/478 |
| 5,384,708 | * 1/1995 | Collins et al. | 364/464.02 |
| 5,448,490 | 9/1995 | Gottlieb et al. | 364/478 |
| 5,777,883 | 7/1998 | Lau et al. | 364/478.08 |
| 5,873,073 | * 2/1999 | Bresnan et al. | 705/410 |
| 6,076,081 | * 6/2000 | Bass et al. | 705/401 |

FOREIGN PATENT DOCUMENTS

60041846-A * 3/1985 (JP) ................................ G06F/5/04

OTHER PUBLICATIONS

"Taming technology's tidal wave", Pavely, Richard W., Office Systems v15n4; pp. 26–30; Apr. 1998.*

* cited by examiner

Primary Examiner—James P. Trammell
Assistant Examiner—Calvin L Hewitt, II
(74) Attorney, Agent, or Firm—Michael J. Cummings; Christopher J. Capelli; Michael E. Melton

(57) ABSTRACT

An operating management system and method for selectively interacting with at least one postage meter provided on each one of a plurality of inserter systems coupled to the operating management system. Each inserter system having a control system and the operating management system includes a computer coupled to each control system of each inserter system. Each control system is coupled to at least one postage meter, the computer being adapted to selectively interact with at least one postage meter provided on each said inserter system to obtain selected information therefrom.

3 Claims, 4 Drawing Sheets

METHOD AND SYSTEM FOR SELECTIVELY INTERACTING WITH A POSTAGE METER PROVIDED ON AN INSERTER SYSTEM

FIELD OF THE INVENTION

The present invention relates generally to operating management systems for document inserter systems, and more particularly, to operating management systems adapted to remotely monitor and control postage meters implemented on document inserter systems.

BACKGROUND OF THE INVENTION

Multi-station document inserting systems generally include a plurality of various stations that are configured for specific applications. Typically, such inserting systems, also known as console inserting machines, are manufactured to perform operations customized for a particular customer. Such machines are known in the art and are generally used by organizations, which produce a large volume of mailings where the content of each mail piece may vary.

For instance, inserter systems are used by organizations such as banks, insurance companies and utility companies for producing a large volume of specific mailings where the contents of each mail item are directed to a particular addressee. Additionally, other organizations, such as direct mailers, use inserts for producing a large volume of generic mailings where the contents of each mail item are substantially identical for each addressee. Examples of such inserter systems are the 8 series and 9 series inserter systems available from Pitney Bowes, Inc. of Stamford, Conn.

In many respects the typical inserter system resembles a manufacturing assembly line. Sheets and other raw materials (other sheets, enclosures, and envelopes) enter the inserter system as inputs. Then, a plurality of different modules or workstations in the inserter system work cooperatively to process the sheets until a finished mailpiece is produced. The exact configuration of each inserter system depends upon the needs of each particular customer or installation.

For example, a typical inserter system includes a plurality of serially arranged stations including at least one postage meter, an envelope feeder, a plurality of insert feeder stations and a burster-folder station. There is a computer generated form or web feeder that feeds continuous form control documents having control coded marks printed thereon to a cutter or burster station for individually separating documents from the web. A control scanner is typically located in the cutting or bursting station for sensing the control marks on the control documents. According to the control marks, these individual documents are accumulated in an accumulating station and then folded in a folding station. Thereafter, the serially arranged insert feeder stations sequentially feed the necessary documents onto a transport deck at each insert station as the control document arrives at the respective station to form a precisely collated stack of documents which is transported to the envelope feeder-insert station where the stack is inserted into the envelope. The finished envelope is then conveyed to a postage station having a postage meter for affixing the appropriate postage to the envelope. A typical modern inserter system also includes a control system to synchronize the operation of the overall inserter system to ensure that the collations are properly assembled.

Typically, an inserter operator employs one or more inserter systems in a common environment (a "shop"). A current trend is to employ an operations management system (OMS) in each shop that is central and connected to each inserter system. More particularly, the OMS connects to the control system of each inserter system so as to monitor the operation of each inserter as well as to control its operation thereof. In regards to monitoring and controlling the operation of postage meters implemented on an inserter system, a difficulty arises in that this is quite burdensome because an expert in software engineering who is skilled in the art of electronic communications needs to produce the software required for the control system of the inserter to communicate with a postage meter. Thus, in the past, when a user needed to obtain statistical information from a particular postage meter, the user had to directly intervene with the interfacing device provided on that postage meter. Likewise, when a postage funds needed to be replenished in a particular postage meter, the user had to manually acquire an access code from the postage meter interfacing device, dial a postage data center, record the refill combination code and then intervene directly with the meter interfacing device so as to input the refill combination code into the postage meter in order to replenish postage funds thereinto. Obviously this was both burdensome and inefficient as it required the inserter system to be "off-line" while the operator is directly interacting with the postage meter.

SUMMARY OF THE INVENTION

The present invention provides a central operating management system that is adapted to connect to the control system of an inserter so as to monitor and control each postage meter implemented on each inserter system coupled to the operating management system.

The operating management system is capable of recording operating statistics relating to each postage meter as well as replenishing funds from a central remote postage database without user intervention on the postage meter itself The operating management system includes a computer coupled to each control system of each inserter system. Each control system is coupled to at least one postage meter, the computer being adapted to selectively interact with at least one postage meter provided on each said inserter system to obtain selected information therefrom.

The method for selectively interacting with at least one postage meter includes the steps of selecting at least one said postage meter that is desired to interact with the operating management system as well as selecting a type of information that is to be retrieved by the operating management system in regards to the selected postage meter. Transmitting from the operating management system a request for the selected information to the inserter systems having the selected postage meter. And, transmitting the selected information from the control system of the inserter system having the selected postage meter and receiving in the operating management system the transmitted selected information.

BRIEF DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which.

DETAILED DESCRIPTION OF THE PREFERRED EMBODIMENT

Figure 1:
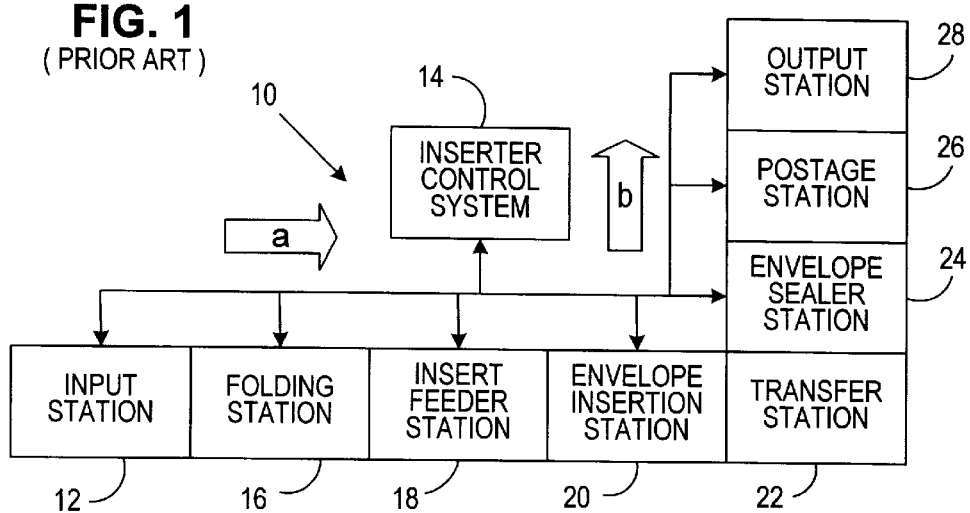
FIG. 1 is a block diagram of a document inserting system in which the present invention is incorporated.

In describing the preferred embodiment of the present invention, reference is made to the drawings, wherein there is seen in FIG. 1 a schematic of a typical document inserting system, generally designated 10, which is coupled to an Operating Management System 100 (hereinafter "OMS") (FIG. 2) embodying the present invention. A brief description of this typical inserting system 10 is given to set forth the operating environment for OMS 100.

In the following description, numerous paper handling stations implemented in a typically prior art inserter system 10 are set forth to provide a brief understanding of a typical inserter system. It is of course apparent to one skilled in the art that the present invention may be practiced without the specific details in regards to each of these paper-handling stations of inserter system 10.

As will be described in greater detail below, document inserter system 10 preferably includes an input station 12 that feeds paper sheets from a paper web to an accumulating station that accumulates the sheets of paper in collation packets. Preferably, at least one sheet, if not all the sheets of a collation are coded (the control document), which coded information enables the control system 14 of inserter system 10 to control the processing of documents in the various stations of the mass mailing inserter system. The code can comprise a bar code, UPC code or the like. The inserter control system 14 may herein be referred to as an "ICS."

Essentially, input station 12 feeds sheets in a paper path, as indicated by arrow "a," along what is commonly termed the "deck" of inserter system 10. After sheets are accumulated into collations by input station 12, the collations are folded in folding station 16 and the folded collations are then conveyed to a insert feeder station 18. It is to be appreciated that a typical inserter system 10 includes a plurality of feeder stations, but for clarity of illustration only a single insert feeder 18 is shown.

Insert feeder station 18 is operational to convey an insert (e.g., an advertisement) from a supply tray to the main deck of inserter system 10 to be nested with the aforesaid sheet collation conveying along the main deck. The sheet collation, along with the nested insert(s), are next conveyed to an envelope insertion station 20 that is operative to insert the collation into an open envelope. Afterwards, the stuffed envelope is then preferably conveyed to a transfer module station 22.

The transfer module 22 changes the direction of motion of flat articles (e.g., envelopes) from a first path (as indicated by arrow "a") to a second path (as indicated by arrow "b"). In other words, transfer module 22 takes a stuffed envelope from the envelope insertion station 20 and changes its direction of travel by ninety degrees (90°). Hence, transfer module 22 is commonly referred to in the art as a "right-angle transfer module" or a "take-away transfer module."

After the envelope changes its travel direction, via transfer module 22, it is then preferably conveyed to an envelope sealer station 24 for sealing. After the envelope is sealed, it is then conveyed to a postage station 26 having at least one postage meter for affixing appropriate postage to the envelope. Finally, the envelope is preferably conveyed to an output station 28 that collects the envelopes for postal distribution.

It is noted that the postage station preferably includes a weighing station upstream from the postage meter for weighing the envelope prior to its arrival at the postage meter so as to determine the appropriate postage to be affixed to the envelope. An example of such postage stations implemented on an inserter system can be found in commonly assigned U.S. Pat. No. 4,817,042, which is hereby incorporated by reference in its entirety.

As previously mentioned, inserter system 10 also includes a control system 14 preferably coupled to each modular station of inserter system 10, which control system 14 controls and harmonizes operation of the various modular stations implemented in inserter system 10. As an example of such a control system can be found in commonly assigned U.S. Pat. Nos.: 3,935,429; 4,527,791; 4,568,072; 5,345,547; 5,448,490 and 5,027,279, which are all hereby incorporated by reference in their entirety. Preferably, control system 14 uses an Optical Marking Reader (OMR) for reading the code from each coded document.

It is to be appreciated that the depicted embodiment of a typical prior art inserter system 10 is only to be understood as an exemplary configuration of such an inserter system. It is of course to be understood that such an inserter system may have many other configurations in accordance with a user's specific requirements.

As previously mentioned, in regards to the aforesaid prior art inserter system 10 of FIG. 1, when an operator or user desires to obtain statistical information from a postage meter, or replenish funds thereinto, which meter is implemented in the postage station 26, the user must directly intervene with the interfacing device provided on the meter itself. Further, it is typical for an inserter system to implement a plurality of postage stations each having its own postage meter. Thus, in the prior art, the user is was required to interact separately with each postage meter implemented on a inserter system. Thus, this task is clearly burdensome and time consuming which reduces the overall efficiencies of the inserter system.

Figure 2:
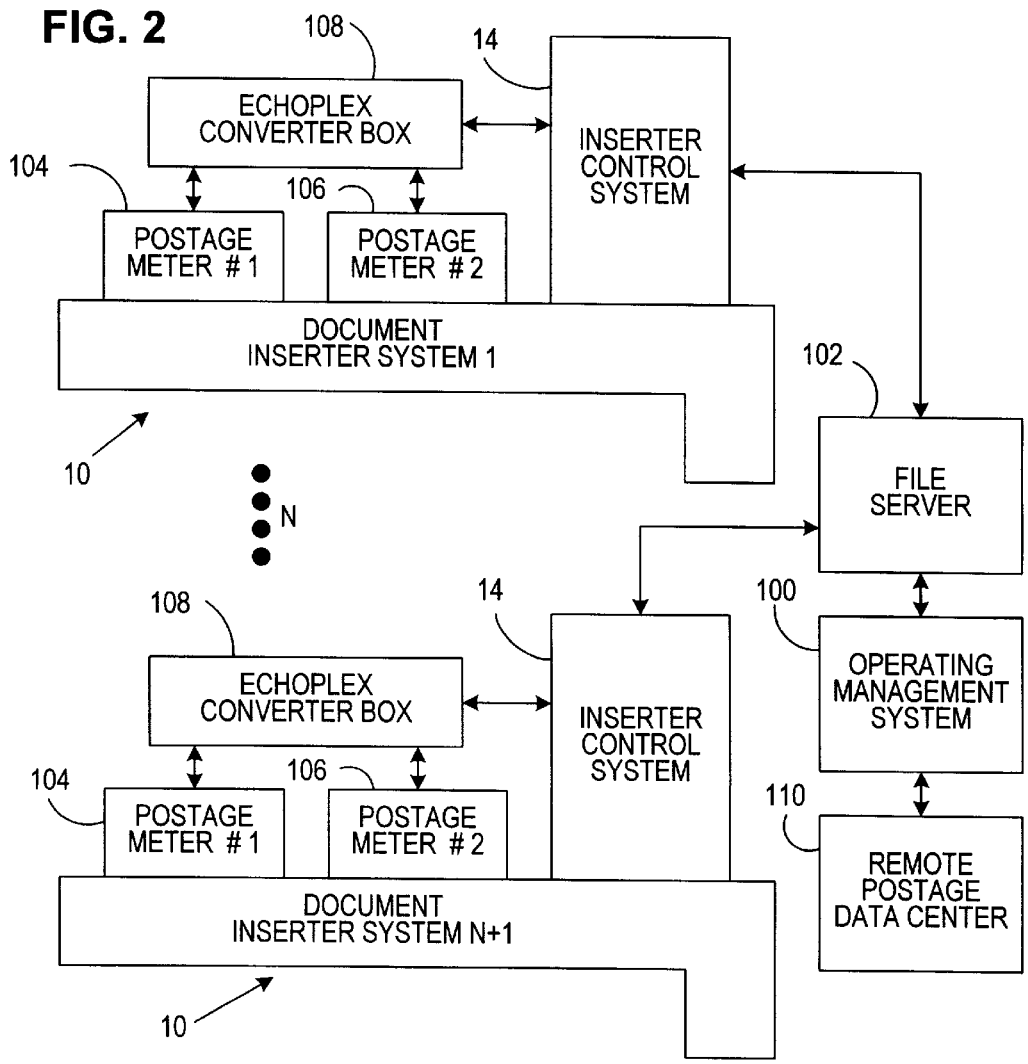
FIG. 2 is a block diagram of an Operating Management System connected to a plurality document inserting systems.

Referring now to FIG. 2 an Operating Management System according to the present invention is depicted generally at 100. As will be discussed below, the implementation of OMS 100 overcomes the above-mentioned shortcomings by enabling a user to interact with each postage meter implemented on each inserter system 10 coupled to the present invention OMS 100. In accordance with the present invention, both the OMS 100 and each inserter control system 14 coupled to the OMS 100 are to be understood to be a Windows™ based operating system (e.g., Win 3.1x, Win 9x or any version of Windows™ NT).

With reference to FIG. 2, an OMS 100 is depicted coupled to a plurality (N+1) of inserter systems 10. For ease of description, each inserter system 10 is understood to be commonly configured. Of course it is to be appreciated that each inserter system 10 coupled to OMS 100 may differ in configuration from each other and may further employ differing Inserter Control Systems 14. Further, it is to be appreciated that OMS 100 is not to be understood to be restricted to be coupled to a plurality of inserter systems 10 but rather may be coupled to only a single inserter system 10.

OMS 100 is coupled to a file server 102, which file server 102 couples to the inserter control system 14 of each respective inserter system 10. As is conventional, a file server is known as a device that brings connectivity to other devices, in this instance, the inserters 10 and the OMS 100. In other words, file servers are the hub of a networking system in which resides the software and hardware necessary to operate and control the network system allowing the external devices(e.g., inserters and OMS) to be linked, to communicate with one another, to transfer and share data, etc.. That is, the file server 102 enables the OMS 100 to communicate with each inserter system 10 in a common environment. As stated above, each inserter system 10 includes at least one postage meter 106. For purposes of this discussion, each inserter system includes two postage meters 104 and 106.

It is to be appreciated that in order for the inserter control system 14 to communicate with each postage meter 104 and 106, each inserter system 10 is preferably provided with an echoplex converter box 108 that is coupled to each postage meter 104 and 106, and to the inserter control system 14 on each inserter system 10. Briefly stated, "echoplex" is to be understood to be a Pitney Bowes™ propriety communication protocol, invented and developed by Pitney Bowes™. Echoplex was created to allow Pitney Bowes™ postage meters to communicate using an encrypted type messaging scheme for confidentiality from external sources. It is designed to permit only authorized types of hardware devices to communicate with postage meters. The inserter systems communicates and controls this type of postage meter using this echoplex protocol to enable the postage meter to in turn communicate with the control system of the inserter system. An example of this aforementioned echoplex system can be found in commonly assigned U.S. Pat. No. 4,535,421, which is hereby incorporated by reference in its entirety. More particularly, the echoplex converter box was developed to "hide" echoplex and to simplify development efforts. Thus, the echoplex converter box allows the inserter system to use a protocol standard in which the inserter system uses a predefined set of commands and a standard protocol to communicate with the postage meter, via the echoplex converter box. The echoplex converter box receives messages in this protocol, converts them to echoplex, and sends the messages to the postage meter. In turn, any responses from the postage meter are received by the echoplex converter box, in echoplex, and are converted to the standard protocol so as to be sent to the inserter system. To put simply, each echoplex converter box 108 enables the OMS 100 to communicate directly to each inserter system, via the file server, whereby the control system of the inserter system communicates directly with each postage meter, via the echoplex converter box.

As will be discussed further below, the OMS 100 is also preferably coupled to a remote postage data center 110. As is well known, the remote data postage center 110 is operational to transmit postage finds to an identified postage meter in the form of encrypted information. Such a remote postage data center 110 is described in commonly assigned U.S. Pat. Nos. 3,792,446; 4,138,735 and 4,447,890; which are all hereby incorporated by reference in their entirety. Preferably, the OMS 100 utilizes a telephony connection, via modems, to communicate with remote postage data center 110.

With the structural features of OMS 100, in connection with a plurality of inserter systems 10 being described above, discussion will now turn to its method of use in reference to OMS 100 replenishing postage funds in each postage meter 104 and 106 of each inserter system 10 as well as recording statistical information relating to each postage meter 104 and 106.

Figure 3:
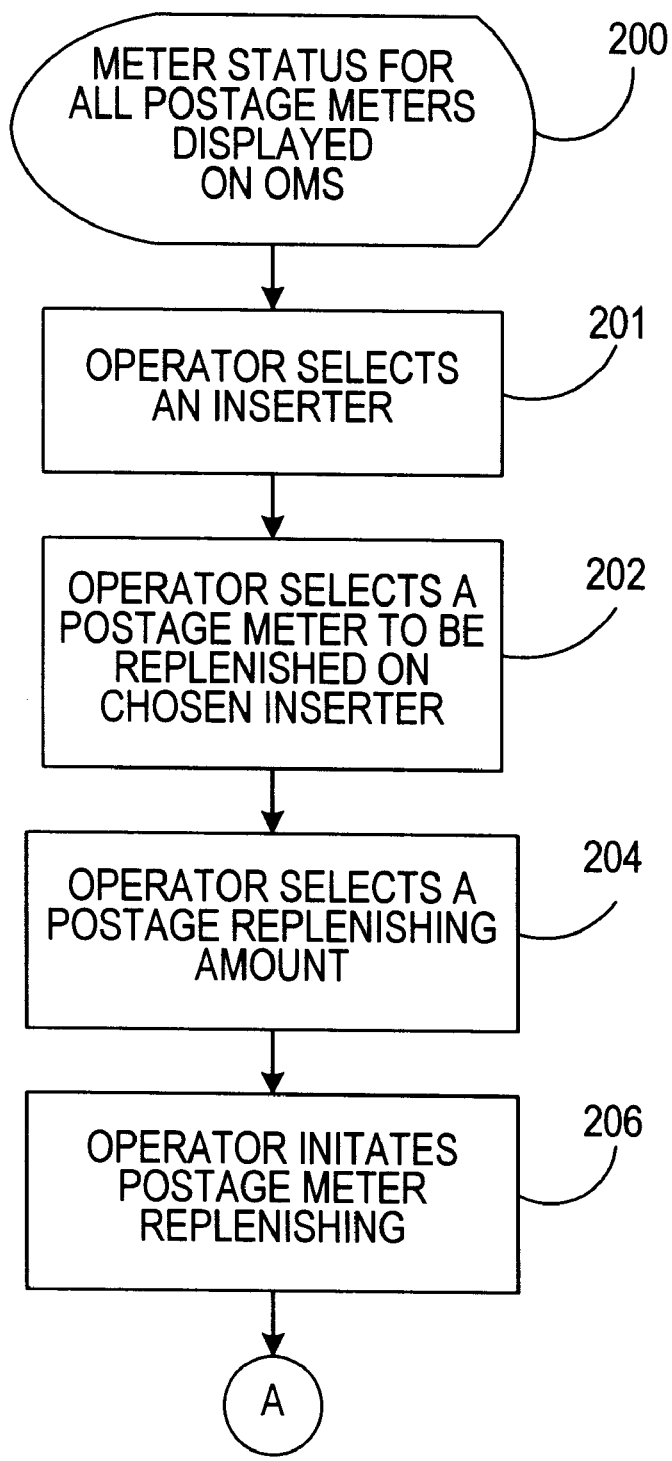
FIGS. 3 and 4 are flow charts depicting the steps taken by the Operating Management System of FIG. 2 to replenish funds in a postage meter implemented on a document inserting system.
Figure 4:
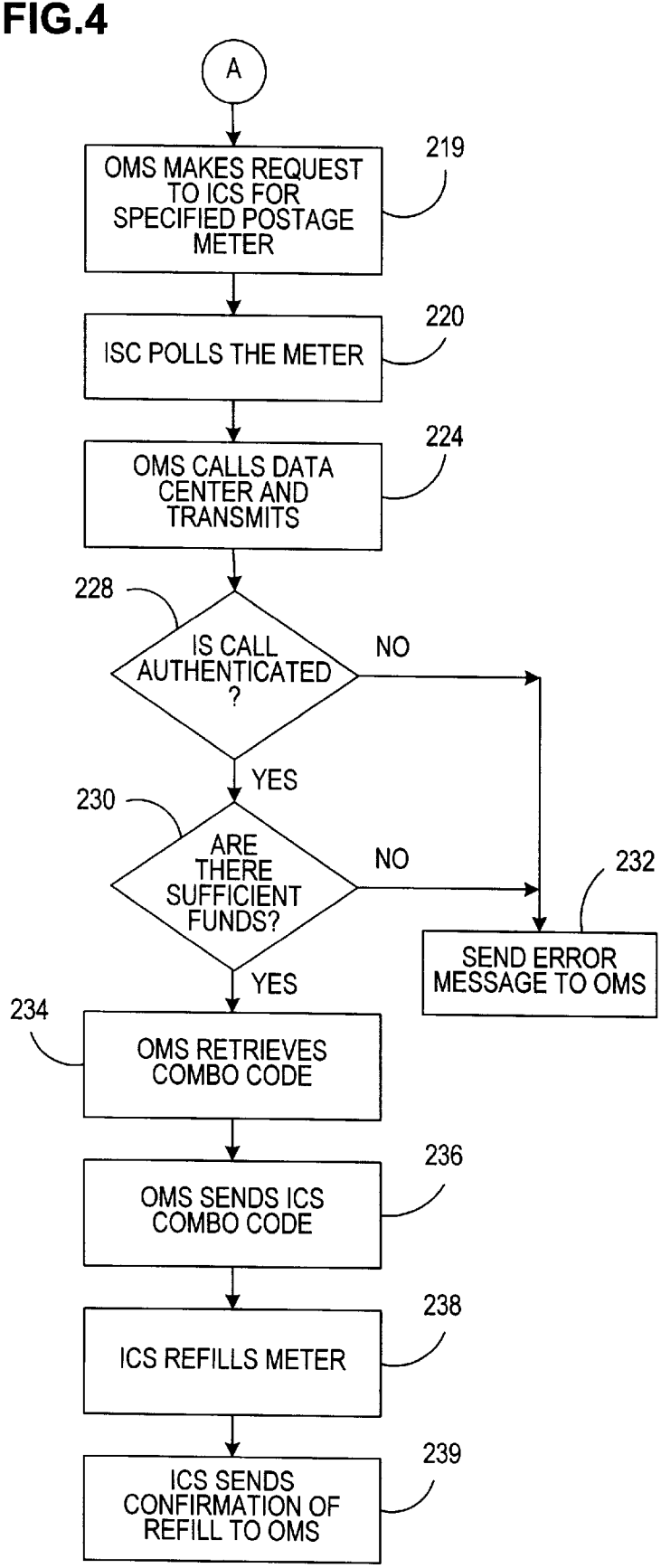

In regards to replenishing postage funds in each postage meter 104 and 106, reference is made to FIGS. 3 and 4 which depict the preferred steps for accomplishing this task. First, preferably through the interfacing device (i.e., keyboard or touch-screen) provided on the OMS 100, the user selects a postage meter in which funds are to be replenished (steps 201, 202). It is to be appreciated that preferably all postage meters are displayed on the display screen in reference to their associated inserter system, whereby the operator merely has only to select the postage meter (step 200). It is to be further appreciated that there are a number of ways in which a user can select the postage meter which is to have it's funds replenished. For instance, the display monitor of the OMS 100 can have a touch screen monitor which displays all the inserter systems and well as their postage meters, whereby the user simply touches the screen portion depicting the desired postage meter on one of the inserter systems (step 201).

After a postage meter has been selected, the user inputs into the OMS 100 (via it's interfacing device) the amount of postage funds to be replenished into the chosen postage meter (step 204). The user then initiates the remote postage meter funds replenishing process (step 206). Referring now to FIG. 4, the OMS 100 instructs the inserter control system 14 of the inserter 10 having the chosen meter to poll that meter to determine its unique identification information (steps 119, 220). The OMS 100 then retrieves this unique identifying information from the inserter control system 14 of the chosen postage meter (step 220) and stores this information in memory. Typically, this unique identification information is what is known as an "access code." It is this access code, along with the serial number of the selected postage meter and the customer account number, as well as the refill amount, which allows the acquisition of the combination code (as will be discussed below) from.

Preferably through a telephony connection, the OMS 100 (via a modem) connects to the remote data postage center 110 (step 224). After this connection is established, the OMS 100 transmits the postage meter identification information to the postage data center 110 as well as the postage funds request (step 224). The postage data center 110 then authenticates the postage meter (step 228) (as defined by it identification information) and determines if sufficient funds are available in view of the funds request (step 230). In the event the meter cannot be either authenticated or insufficient funds are available, a message confirming either event is transmitted back to the OMS 100 (step 232).

Alternatively, it is to be noted that an operator can initiate a postage meter refill directly at the inserter system 10 on which the selected postage meter 104,106 resides. Briefly, this is accomplished by having the operator enter the refill amount for the selected meter 104,106 into the inserter control system 14 (connected to the chosen postage meter 104,106) whereafter the inserter control system 14 transmits the appropriate data to the OMS 100, which OMS 100 then connects with the remote postage data center 110 so as to transmit the data initiating the postage meter refill.

After identification and availability of finds has been confirmed, the remote data center first retrieves and then transmits to the OMS 100 what is known as a "combination code", which is encrypted information used to replenish the desired funds in the postage meter (step 239). More particularly, and as is known by one skilled in the art, the "combination code" can briefly be defined as, using a combination of the postage meter serial number, the access code number and refill amount as complied by a computer algorithm. After the OMS 100 receives the combo code, the OMS 100 sends the combination code to the control system 14 of the inserter system 10 having the chosen postage meter which is to have it's funds replenished (step 236). The aforesaid control system 14 then inputs the combo code into the chosen postage meter, via the echoplex converter box 108 (step 238). The combo code is then interpreted by the postage meter and the descending funds register of the postage meter is increased an amount corresponding to the amount of funds to be replenished in the meter. Once this is accomplished, the control system 14 of the inserter system 10 transmits a confirmation signal to the OMS 100 (step 234). The funds replenishing process for that chosen postage meter is then complete.

The user of OMS 100 may then replenish the funds in any other postage meter provided on any other inserter system coupled to OMS 100 by repeating the above-described process with respect to that chosen postage meter and it's coupled inserter system. With the process for replenishing the funds in an inserter postage meter being described above discussion will now turn to the process of recording statistical information from each postage meter 104 and 106 provided on each inserter system 10.

Figure 5:
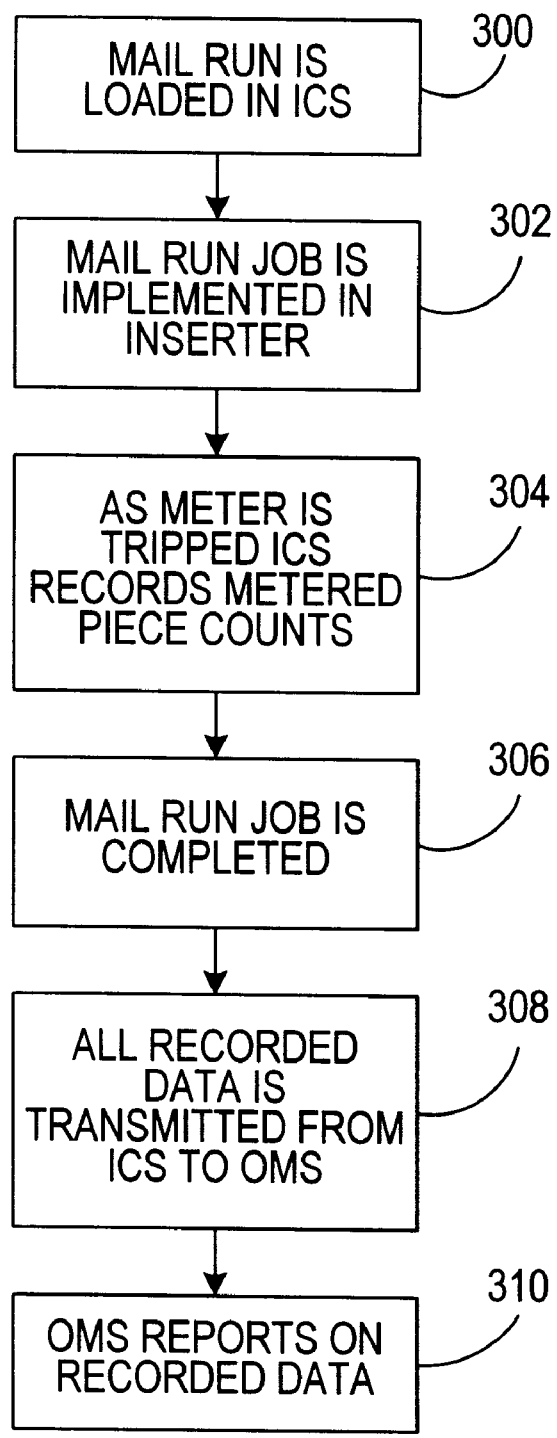
FIG. 5 is a flow chart depicting the steps taken by the Operating Management System of FIG. 2 to record and display statistically information taken from a postage meter implemented on a document inserting system.

Referring now to FIG. 5, with a "mail run job" loaded in the control system 14 of each inserter system 10 coupled to OMS 100 (step 300), each inserter system 10 that is to have statistical information recorded from it's postage meter 104 and 106 begins its mail piece inserting operation (step 302). The "mail run job" can briefly be defined as the batch of mail that is to be processed by the inserter system as defined and configured by the customer. For example, a mail run job can be defined as one thousand (1,000) completed mailpieces where each mailpiece can have varying number of pages, varying inserted material (i.e., advertisements) logos printed on the envelopes, some mailpieces sealed and others not, and a variety of postage amounts printed on the envelopes, etc. That is, it is a job of a predefined number of completed mailpieces, where each mailpiece has been defined on how it is to be completed. It is noted that an inserter 10 need not implement operation as OMS 100 to record statistical information from it's postage meter but rather the OMS 100 is always enabled to record postage meter statistical information. But this information will be limited since the postage meter is idle (e.g., the only information to be recorded is the value of the postage meter's descending register, or in other words, the funds available in the postage meter as well as the amount of funds dispensed).

It is to be appreciated that the OMS 100 is enabled to record statistical information from each postage meter 104 and 106 due to it's connection to the control system 14 each inserter system 10, via the file server 102. And as previously mentioned, each inserter control system 14 is coupled to each postage meter 104 and 106 provided on that inserter system via an echoplex converter box 108. Furthermore, for description purposes, at least one inserter system 10 coupled to OMS 100 is to be operating and reference to one of it's postage meters will be taken.

As each inserter system 10 is operating (according to it's "mail run job") at least one of it's postage meters is continuously being tripped so as to affix appropriate postal indicia to an envelope (step 302). The amount of postage can be either preset by the "mail run job" of the control system 14 or can be determined by a postal scale positioned upstream of the postage meter in the inserter system 10. As the postal meter affixes postage to each envelope it also conveys this postage information to the inserter control system 14, via echoplex converter box 108. The inserter control system 14 in turn stores this information in memory (step 304).

It is to be appreciated that the inserter control system 14 may further process this information in a number of categorization methods. For example, and in addition to the funds remaining and discharged by each postal meter 104 and 106, it may keep count of the total number of mail pieces processed by each postal meter 104 and 106, as well as the postal amount affixed to each mail piece. Further, since a single mail run job may be used for more then one client, the inserter control system 14 may categorize the mail pieces in accordance with each client. For instance, if a "mail run job" is being used for three clients, the inserter control system can then determine how many mail pieces are to be attributed to each one of the three clients as well as the amount of postage funds discharged for each client. It is if course to be appreciated that the inserter control system 14 may process and categorize postage information in number of different ways and the aforesaid categorizations are to be understood to be examples only and are not be understood to be limitations thereof.

After the inserter system 10 completes it's "mail run job", all the statistical data information (including the aforesaid postal information) relating to that "mail run job" remains stored in memory in the control system 14 of the inserter 10 (step 306). When a user of the OMS 100 desires to obtain statistical data information from a chosen postal meter on one of the inserter systems 10 coupled to the OMS 100 (FIG. 2), the user instructs the OMS 100 to send a signal to the control system 14 of the inserter system 10, via file server 102, having the chosen postage meter 104 or 106 to transmit that statistical data regarding the chosen postage meter 104 or 106 to the OMS 100 (step 308). The OMS 100 then reports the statistical postal data to the user (step 310). It is to be appreciated that the OMS 100 can report this data to the user in a number of known ways such as, displaying it on a screen, creating a printed report or storing on a storable medium (e.g., a floppy disk).

It is to be further appreciated that in addition to receiving postal data after an inserter system 10 has completed its "mail run job", the OMS 100 may be operated to send postal data to the OMS 100 on a real time basis. In other words, the ISC 14 sends postage meter 104,106 status information to the OMS 100 on a configured time interval. This allows the OMS 100 to obtain the latest register (e.g., ascending and descending) values of a postage meter 104,106, piece count information and etc., which information is sent to the OMS 100 on the occurrence of specific events (i.e., mail run job end and job pause). Thus, the OMS 100 may then be instructed to categorize this received postal data on predetermined parameters preferably determined by the user of the OMS 100.

After the user the OMS 100 receives the statistical postal data from a chosen postage meter 104 or 106 connected to one of the inserter systems 10 coupled to the OMS 100, the above-described process may be repeated with respect to another one of the postage meters 104 or 106. Thus, all postal statistical data from each postage meter 104 and 106 connected to each inserter system 10 coupled to OMS 100 may be reported by OMS 100 when desired by a user.

Therefore, the above-described system is advantageous in that it enables a user to remotely monitor and configure a postage meter 104 and 106 without requiring the user to individually interface with each postage meter 104 and 106 but rather by having the user only interface with the OMS 100. For example, as described above, when a user desires to replenish postage funds in one of the postage meters 104 and 106 coupled to OMS 100. The user merely chooses that postage meter 104 or 106 from the OMS 100 to replenish postal funds into the chosen postage meter 104 or 106. Hence, the user need not directly interface with the chosen postage meter 104 or 106 but rather only has to interface with the OMS 100 that is coupled to all the postage meters 104 and 106. This greatly eases the user's tasks as well as increases the efficiency of all the inserter systems 10.

In summary, an Operating Management System coupled to a plurality of inserter systems for interfacing with each postage meter on each inserter system has been described. Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. An operating management system for selectively interacting with at least one postage meter provided on each one of a plurality of inserter systems coupled to the operating management system, each inserter system having a control system, the operating management system comprising:

a computer coupled to each said control system of each said inserter system, wherein each said control system is coupled to said at least one postage meter, the computer being adapted to selectively interact with said at least one postage meter provided on each said inserter system; and a file server coupled to the computer of the operating management system, the file server being coupled to the control system of each Inserter system;

wherein each inserter system includes an echoplex converter box coupled to at least one postage meter and to the control system of said inserter system.

2. A method for selectively interacting with at least one postage meter provided on each one of a plurality of inserter systems with each said inserter system having a control system coupled to a said postage meter, the method comprising the steps of:

providing an operating management system having a central computer coupled to each said control system of each one of said plurality of inserter systems;

selecting at least one said postage meter that is desired to interact with said operating management system;

selecting a type of information that is to be retrieved by said operating management system pertaining to said selected postage meter;

transmitting from said operating management system a request for said selected information to a said one of a plurality of inserter systems having said selected postage meter;

transmitting said selected information from the control system of the inserter system having the selected postage meter;

receiving in said operating management system said transmitted selected information;

storing in each said control system of each said inserter system information regarding the amount of postage dispensed by a said postage meter provided on said inserter system;

transmitting from said control system the information pertaining to a said postage meter when requested by said operating management system; and providing an echoplex converter box coupled to each one of said postage meters and a said respective control system wherein a said respective inserter control system communicates with a said postage meter via a said echoplex converter box.

3. A method for selectively interacting with at least one postage meter as recited in claim 6 further including the step of:

transmitting said selected information from a said selected postage meter to said operating management system without storing said selected information in a said inserter control system.

\* \* \* \* \*